(12) United States Patent
Nagappa et al.

(10) Patent No.: US 7,886,147 B2
(45) Date of Patent: Feb. 8, 2011

(54) METHOD, APPARATUS AND COMPUTER READABLE MEDIUM FOR SECURE CONVERSION OF CONFIDENTIAL FILES

(75) Inventors: Yogesh Nagappa, Bangalore (IN); Romain Moreau-Gobard, Palo Alto, CA (US)

(73) Assignee: Siemens Aktiengesellschaft, Munich (DE)

( * ) Notice: Subject to any disclaimer, the term of this patent is extended or adjusted under 35 U.S.C. 154(b) by 1190 days.

(21) Appl. No.: 11/515,877

(22) Filed: Sep. 6, 2006

(65) Prior Publication Data

US 2008/0059794 A1 Mar. 6, 2008

(51) Int. Cl.
*H04L 29/06* (2006.01)
(52) U.S. Cl. .................. 713/165; 713/164; 713/150
(58) Field of Classification Search .................. None
See application file for complete search history.

(56) References Cited

U.S. PATENT DOCUMENTS

| | | | | |
|---|---|---|---|---|
| 6,216,173 B1 * | 4/2001 | Jones et al. | .................. | 715/705 |
| 6,874,139 B2 * | 3/2005 | Krueger et al. | .............. | 717/127 |
| 7,096,358 B2 * | 8/2006 | Zizzi | .......................... | 713/165 |
| 7,406,596 B2 * | 7/2008 | Tararukhina et al. | ........ | 713/165 |

OTHER PUBLICATIONS

Verisign Secured Seal Program; http://www.verisign.com/products-services/security-services/secured-seal/index.html; © 2006.
Location-Independent Data/Software Integrity Protocol; http://rfc1805.x42.com/, © 1995.
Diomidis Spinellis et al., "Trusted Third Party Services for Deploying Secure Telemedical Applications Over the WWW" EUROMED-ETS Schema, Computers and Security © 1999; http://citeseer.ist.psu.edu/spinellis99trusted.html.

\* cited by examiner

*Primary Examiner*—Pramila Parthasarathy
(74) *Attorney, Agent, or Firm*—Harness, Dickey & Pierce, P.L.C.

(57) ABSTRACT

A method of secure file conversion is disclosed. The method includes storing a decrypted version of a previously encrypted file, the encryption and decryption occurring using public key infrastructure, in an allotted memory location of a memory for which read-only access to the stored decrypted file is provided. Next, the memory location is monitored for an attempt to access at least one memory location other than the allotted location. Finally, a file format of the stored decrypted file is converted, the conversion being aborted upon detecting attempt to access at least one memory location other than the allotted memory location. A converter is further disclosed.

26 Claims, 7 Drawing Sheets

Fig. 1

(Prior Art)

METHOD, APPARATUS AND COMPUTER READABLE MEDIUM FOR SECURE CONVERSION OF CONFIDENTIAL FILES

FIELD

The invention generally relates to secure conversion of files.

BACKGROUND

Media (documents, audio, video, etc.) files are known to be stored in various file formats. Currently there are over 18,000 file formats. Operating systems support a defined set of file formats and programs to create files in those formats. For example Microsoft Word is a program used to create word (.doc) files on the Windows operating system. These files cannot be opened on a Mac system for example, and the files created by the Mac AppleWorks program cannot be opened/edited from within the Microsoft Word application, for example.

In a heterogeneous environment including networked computers, file conversion to share information is a necessity. Hence we require file converters to convert between a myriad of file formats. These are used to convert files from different word processing, spreadsheet, graphic, database, etc. formats.

The current trend is towards deploying file converters as web services. Clients requiring a file conversion discover the corresponding web service dynamically. The original file is transmitted to the conversion service and the converted file is received. However, the confidentiality of the files must be protected during the process.

Clients using these services need assurances that copies of the file do not get stored, for example, on the conversion server. Encryption can generally be used to hide the contents of a file. However, file converters require the file in its original format to perform conversion to another format. Hence, the known systems do not achieve both confidentiality and conversion at the same time.

Currently, in known distributed environments, clients send files to a remote system that is running the conversion service. Existing file security techniques only address the protection of the file during transmission to the conversion service. Techniques do not exist that assure that data would not be compromised or tampered by the conversion service.

Most clients require assurance of the confidentiality and integrity of their files. Hence vendors running conversion services execute non-disclosure or confidentiality agreements with the clients. In these agreements the vendors of these services assure that they do not permanently keep any copies of the files and that they are sensitive to confidentiality and security requirements.

The above mechanism of signing non-disclosure agreements is suitable for a static environment of services and clients. But in an environment where new services are added frequently and clients discover these services dynamically, new mechanisms for establishing trust between client and servers are required.

The data transfer between clients and the conversion service is protected using file encryption techniques. The public key infrastructure (PKI) is one such encryption technique that is used to protect documents when they are being transmitted over a network between participants. Every participant in the network has two keys—a public key known to everyone else in the network and a private key only known to the participant. Any document that is encrypted with a participant's public key can only be decrypted by the same participant's private key and vice versa.

Figure 1:
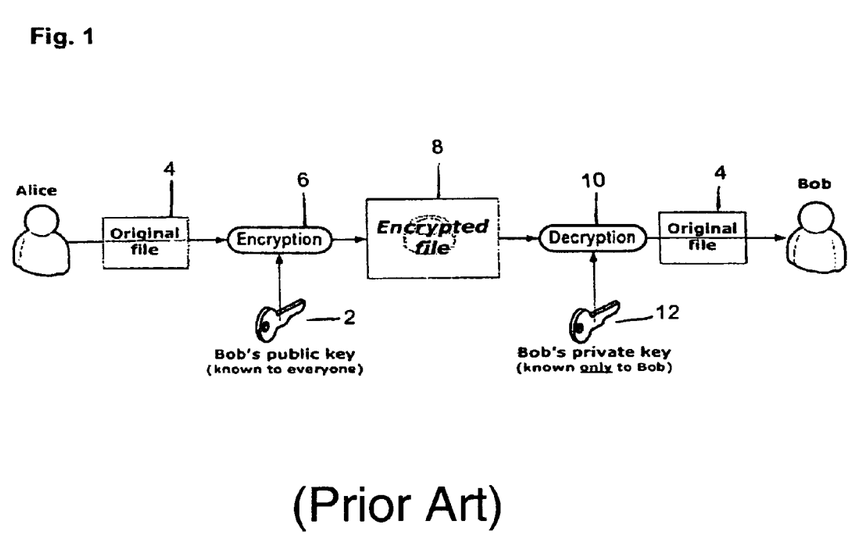
FIG. 1 illustrates known use of PKI.

To understand PKI, reference is made to FIG. 1 illustrating a document transfer between Alice and Bob. Alice knows the public key 2 of Bob. Alice uses Bob's public key to encrypt the document or original file 4 during encryption process 6. The resulting encrypted document or file 8 is sent over a network (such as an internal network, an intranet, the internet, an extranet, etc.) to Bob. It can only be decrypted during decryption process 10 using the Bob's private key 12. Bob's private key 12 is secret and known only to Bob. Bob applies the private key 12 to decrypt the document or original file 4.

The above method ensures data confidentiality during transmission of files across the network. Most conversion services employ PKI to assure their clients that confidentiality is maintained during the transmission.

SUMMARY

The novel method, apparatus and/or computer readable medium of at least one embodiment of the invention, implements a module that uses PKI. This module allows the conversion software access to the original file, but does not allow it to copy it. Hence it achieves both confidentiality and conversion simultaneously.

Such an alternative technique, in at least one embodiment of the invention, controls the file accesses made by the converter. Although the file is presented in its original format, this technique of at least one embodiment of the invention, assures the clients that the confidentiality of the file is maintained.

In at least one embodiment, a method provides for secure file conversion by a converter. The method includes receiving a file from a user, encrypted using a public key of the converter and decrypting the file using a private key of the converter. The method further includes converting the file format of the decrypted file at the converter, the decrypted file being stored in an allotted location in memory for which read-only access to the stored decrypted file is provided. The memory is monitored for an attempt to access at least one memory location other than the allotted memory location and the file format conversion is aborted upon detecting attempt to access at least one memory location other than the allotted memory location. Finally, the file, if converted, is encrypted using a public key of the user and the encrypted file is then sent to the user, the file being decryptable using a private key of the user.

In at least one embodiment, a converter is disclosed for secure file conversion. The converter includes a memory to store a decrypted version of a previously encrypted file, the encryption and decryption occurring using public key infrastructure, the decrypted file being stored in the decrypted file being stored in an allotted memory location for which read-only access to the stored decrypted file is provided. In addition, the converter includes two modules. A first module is used to monitor the memory location for an attempt to access at least one memory location other than the allotted memory location and a second module to convert a file format of the stored decrypted file. The conversion is aborted by the first module upon detecting attempt to access at least one memory location other than the allotted memory location.

BRIEF DESCRIPTION OF THE DRAWINGS

Example embodiments of the invention and further advantageous refinements of the invention in accordance with the claims and subclaims are illustrated in the following schematics. In the drawings:

DETAILED DESCRIPTION OF THE EXAMPLE EMBODIMENTS

In an example embodiment of the present invention, a method provides for secure file conversion by a converter. The method includes receiving a file from a user, encrypted using a public key of the converter and decrypting the file using a private key of the converter. The method further includes converting the file format of the decrypted file at the converter, the decrypted file being stored in an allotted location in memory for which read-only access to the stored decrypted file is provided. The memory is monitored for an attempt to access at least one memory location other than the allotted memory location and the file format conversion is aborted upon detecting attempt to access at least one memory location other than the allotted memory location. Finally, the file, if converted, is encrypted using a public key of the user. The encrypted file is then sent to the user, with the file being decryptable using a private key of the user. Further, in an alternative embodiment, upon detecting attempt to access at least one memory location other than the allotted memory location, the conversion is aborted and information in at least the allotted memory location of the memory is deleted.

In another example embodiment of the present invention, a method provides for secure file conversion by storing a decrypted version of a previously encrypted file, the encryption and decryption occurring using public key infrastructure, in an allotted memory location of a memory for which read-only access to the stored decrypted file is provided. The method then includes monitoring the memory for an attempt to access at least one memory location other than the allotted location; and converting a file format of the stored decrypted file, the conversion being aborted upon detecting attempt to access at least one memory location other than the allotted memory location. Further, in an alternative embodiment, upon detecting attempt to access at least one memory location other than the allotted memory location, the conversion is aborted and information in at least the allotted memory location of the memory is deleted.

Further, in a still further example embodiment of the present invention, a converter is disclosed for secure file conversion. The converter includes a memory to store a decrypted version of a previously encrypted file, the encryption and decryption occurring using public key infrastructure, the decrypted file being stored in the decrypted file being stored in an allotted memory location for which read-only access to the stored decrypted file is provided. In addition, the converter includes two modules. A first module is used to monitor the memory location for an attempt to access at least one memory location other than the allotted memory location and a second module to convert a file format of the stored decrypted file. The conversion is aborted by the first module upon detecting attempt to access at least one memory location other than the allotted memory location. Further, in an alternative embodiment, upon detecting attempt to access at least one memory location other than the allotted memory location, the first module aborts the conversion by the second module and deletes information in at least the allotted memory location of the memory.

These and other example embodiments will be explained in more detail, hereafter, with reference to the figures.

Figure 2:
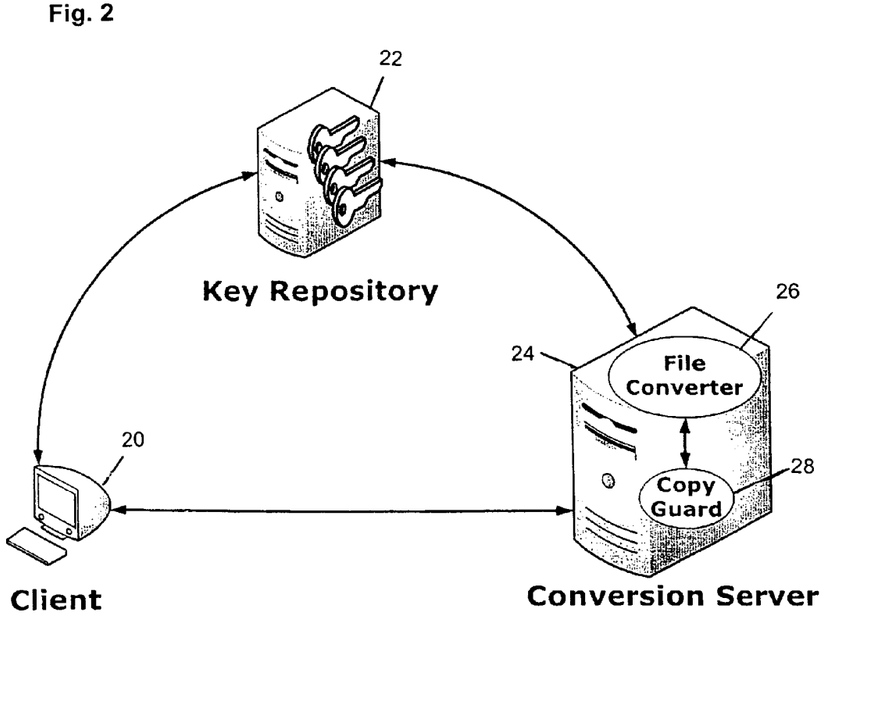
FIG. 2 illustrates an architecture component arrangement of an embodiment of the invention.

FIG. 2 illustrates an architecture component arrangement of a network arrangement of an example embodiment of the invention. More specifically, FIG. 2 includes a client 20, a key repository 22, and a conversion server (or converter) 24 network arrangement of an embodiment of the invention (noting that the network connection can be wireless or wired, and noting that it can be any type of network including but not limited to any type of network connections through, for example, an extranet, an intranet, the internet, etc.). The conversion server 24 includes at least two modules, including a file converter module 26 and a copy guard module 28.

The client 20 of FIG. 2 represents the user or owner of the original file. The client 20 can include any type of networked component (wireless or wired), such as for example, a personal computer or PC, any type of handheld device (PDA, telephone, handheld email device, etc.), etc. The client 20 can be used to request the conversion server 24 to convert any type of file to a different file format.

The key repository 22 stores the public keys of all the entities (clients and conversion servers) in the network in a known manner. Whenever an entity needs to send a file over a network connection, it queries the key repository in a known manner and retrieves the public key of the entity to which it wants to send the file.

The conversion server 24 is used to convert the format of the file sent from a client, to a different format. It houses at least two modules, including the file converter module 26 and the copy-guard module 28. The file converter module 26 may be a software module including software that performs the actual file format conversion. It works in association with the copy-guard module 28.

The copy-guard module 28 may also be a software module including software that performs memory management and monitoring for the entire process of file format conversion. The copy-guard module 28 assures file confidentiality for the client. It manages and monitors a chunk of memory for temporarily storing the original and converted files during file conversion, such as media files for example. In addition, the copy-guard module 28 prevents programs other than the file-converter module 26 from accessing this memory chunk.

Thus, the memory chunk is made to be available only to the file-converter module 26 and the copy-guard module 28, and not to any other process/device in the system. One example non-limiting way of achieving this may be to create a network drive with special access only to the copy-guard module 28 and file-converter module 26 and then monitoring the interrupts to the created drive.

The copy-guard module 28 provides the file converter module 26 with read-only access to the original file from the client 20. It monitors the write operations made by the file converter module 26. The copy-guard module 28 monitors the memory for an attempt to access memory locations other than the allotted location, and aborts the file format conversion upon detecting an attempt to access at least one memory location, other than the allotted. Thus, if write operations are attempted to access at least one memory location other than that allotted by the copy-guard module 28, the copy-guard module 28 aborts the process and then cleans up the memory in a known manner (for example, system counters could be used which help determine which process is causing disk input/output operations and on which file are such operations being caused). This assures the client 20 that the file converter module 26 cannot make duplicate copies of the original or converted file. At the end of the conversion, the copy-guard module 28 cleans up the memory so that no client data remains on the memory disk of the conversion server 24.

As stated above, the copy-guard module 28 includes copy-guard memory, which is the chunk of memory (not shown in FIG. 2) that is managed exclusively by the copy-guard module 28. This memory chunk is constantly monitored and any illegal access is averted by the copy-guard module 28.

Figure 3:
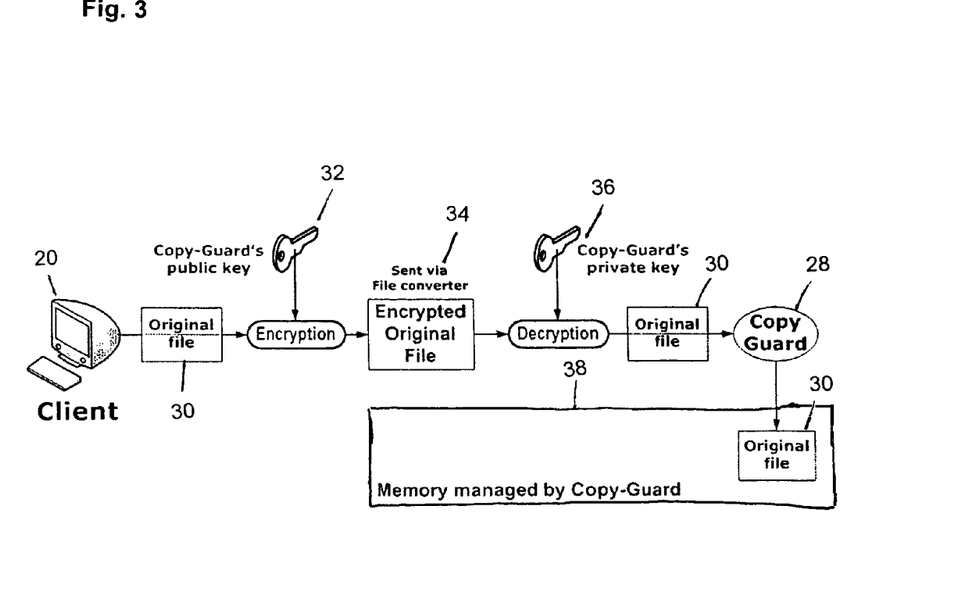
FIG. 3 illustrates an encryption methodology of an embodiment of the invention.

With respect to FIG. 3, the methodology of a secure transmission of a file, such as a media file for example, from client 20 to conversion server 24 is described.

Initially, the client 20 obtains a public key of the copy-guard module 28 of the conversion server 24. This can be done in any number of ways, such as from a key repository 22 (not shown in FIG. 3), for example. The original file 30 that the client 20 wants to have converted into a new file format by the conversion server 24, is then encrypted in a known manner using the public key 32 of the copy-guard module 28 of the conversion server 24. Only application of the private key 36 of the copy-guard module 28 of the conversion server 24 can decrypt this encrypted file 34. Thus, secure transmission of the file over the network connection is ensured.

The encrypted file 34 is sent over the network to the file converter module 26 of the conversion server 24. The file converter module 26 transfers this encrypted file 34 to the copy-guard module 28. The copy guard module 28 applies its private key 36 to decrypt the file and reproduce the decrypted original file 30. The decrypted file (original file 30) is stored in an allotted location of the memory space 38, which is exclusively managed by the copy-guard module 28. The use of PKI here assures the client that only the copy-guard module 28 of the conversion server 24 retrieves the original file 30.

The memory management may be done, for example, using a method similar to that of the operating system. An operating system must divide processes in space, so that processes do not bump into each other's working memory. In solving this problem, the operating system manages memory space and allocation.

The copy guard module 28 may be synonymous with the operating system in this respect, although it is at a different layer of abstraction. The copy guard module 28 allocates space for the file-converter module 26 to run, and the copy guard module 28 constantly monitors that memory space.

Figure 4:
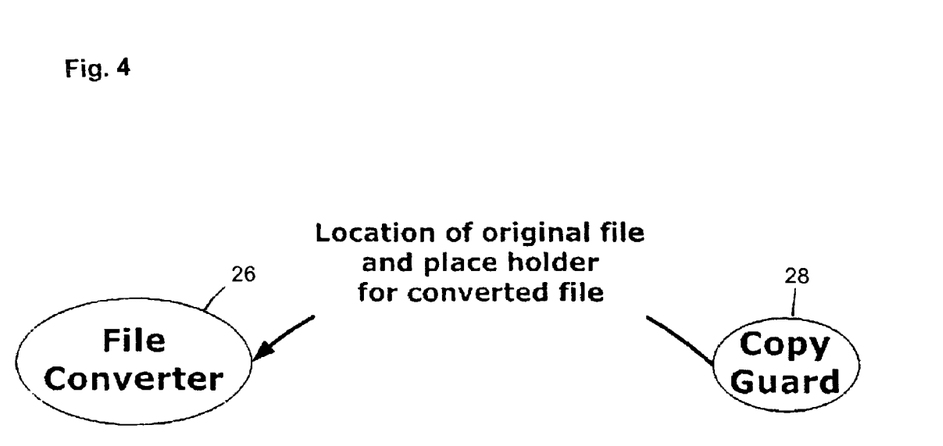
FIG. 4 illustrates a technique of memory allocation an embodiment of the invention.

With respect to FIG. 4, memory allocation for the original file 30 is shown, as monitored and managed by the copy-guard module 28.

The copy-guard module 28 acquires memory allotment from the conversion server 24 for conversion use by the file converter module 26 for conversion of the original file 30. The allotted memory location of the original file 30 and a memory placeholder, selected for the converted file, are sent to the file converter module 26 for conversion of the original file 30. The memory placeholder points to and holds a location in the managed memory 38 of the copy-guard module 28. When performing the file conversion, the file converter module 26 is required to write only to the location pointed to by the placeholder.

The allocation of memory for a process is usually done by the operating system. The processes are achieved to comply and work within that allocated memory space. If not, the operating system would indicate a core dump error and the process would be terminated. In the case of the file converter module 26, the memory allocation is achieved by the copy-guard module 28. If the converter module 26 attempts to access other memory locations, then the copy-guard module 28 would indicate an error and terminate the process of file conversion. Just as the memory manager of the operating system would not allow the process to write to a non-allotted memory location (by maintaining a table which is updated whenever a process requests more memory or releases memory for example), the copy-guard module 28 would not allow the file converter module 26 to access a non-allotted memory location (by maintaining a similar table for example).

Figure 5:
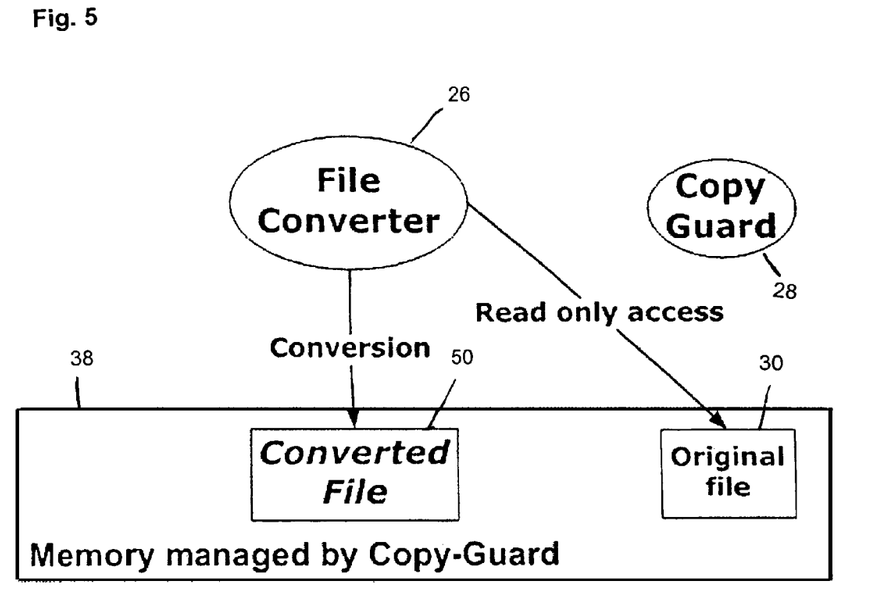
FIG. 5 illustrates a file conversion technique of an embodiment of the invention.

With respect to FIG. 5, file conversion by the file converter module 26 is illustrated.

The write operations of the file converter module 26 for conversion of the original file 30 are monitored by the copy-guard module 28. Any attempt by the file converter module 26 to write to any other memory location is recognized and thwarted by the copy-guard module 28 as described above. The copy-guard module 28 thereby restricts the memory accessed by the file converter module 26. The copy-guard module 28 provides read-only access to the original file 30 and specifies a memory location to which the file converter module 26 can write. Thus, the file converter module 26 accesses the original file 30, converts the file, and then writes the converted file 50 to the memory location of the memory space 38 specified and exclusively managed by the copy-guard module 28.

If the copy-guard module 28 recognizes any illegal write operations, and/or any attempts to access at least one memory location other than the allotted memory location, by the file converter module 26 during conversion of the original file 30, it aborts the file format conversion process. This step assures clients that duplication of converted files 50 or original files 30 by the file converter module 26 is prevented and thus assures that secure conversion of the original file 30 takes place by the file converter module 26.

Figure 6:
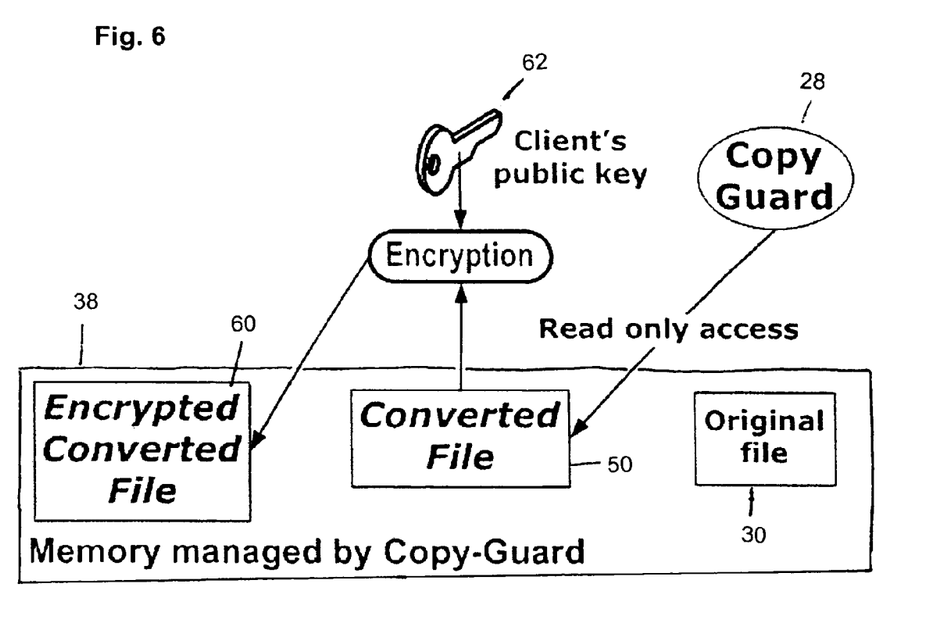
FIG. 6 illustrates an encryption technique of an embodiment of the invention.

With respect to FIG. 6, encryption of the converted file 50 is illustrated.

For encryption of the converted file 50, the copy-guard module 28 first obtains the public key of the client 20, from the key repository 22 for example. The converted file 50 is then encrypted using this selected public key. The encrypted file 60 can then only be decrypted with the private key of the client 20. This encrypted file 60 may then be saved in the memory 38 managed by the copy-guard module 28, at the specified memory location to which the file converter module 26 can write.

Figure 7:
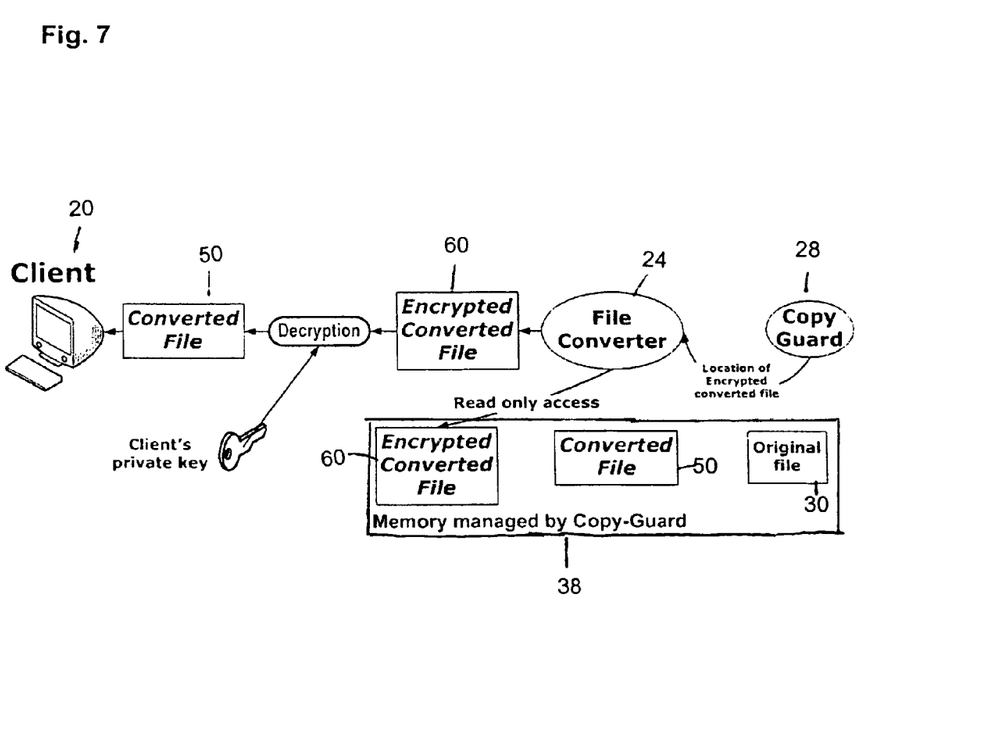
FIG. 7 illustrates a secure transmission technique of an embodiment of the invention.

With respect to FIG. 7, secure transmission of the converted encrypted file 60 from the conversion server 24 to the client 20.

Initially, the copy-guard module 28 informs the file converter 24 about the memory location of the encrypted converted file 60. The file converter 24 reads the encrypted converted file 60 from the allotted memory location and then sends it to the client 20. The client 20 is then able to decrypt the encrypted converted file 60 using its private key, thus insuring secure transmission of the converted file 60. As such, both the original file 30 and converted file 60 are securely transmitted, and further secure conversion of the original file 30 to the converted file 60 is also maintained.

After the entire conversion process is over, the copy-guard managed memory 38 may be blanked and hence all data related to the file sent for conversion may be deleted. Alternatively, just the original file 30 may be deleted and the encrypted converted file 60 may be maintained, if desired by the client 20. If a client or application requires that a conversion server 24 maintain copies of the encrypted original/converted files, it will not have any negative implicatons.

By at least one embodiment of the aforementioned system and methodology described above, confidentiality of the original files 30 of the client 20 is maintained, even though the original file 30 is provided to the file converter 24 (externally located for example) for conversion. Clients that are part of an architecture that employs dynamic formation of trust between entities need constant assurances their transactions are protected. They may also require assurances that their files and data are kept confidential. At least one embodiment of the system and methodology described above assures clients that conversion servers 24, running the file converter module 26 with the copy-guard module 28, cannot duplicate the original files 30 sent for conversion.

At least one embodiment of the aforementioned system and methodology employs the public key infrastructure that proves to clients the identity of the file conversion server 24. At least one embodiment of the aforementioned system and methodology may further alleviate security concerns such as phishing and identity theft, for example.

The following is a list of third-party assurance methods. These methods address the need for third-party assurance in the areas of network/web security/online transactions. Until the embodiments of the aforementioned system and method, there did not exist techniques to address third-party assurances in the domain for file conversion in dynamic architectures where services are added and removed periodically and consumers within the architecture discover these services dynamically. Thus, the following provides some non-exhaustive, non-limiting example applications for at least one embodiment of the aforementioned system and methodology:

VeriSign Secured Seal Program
    http://www.verisign.com/products-services/security-services/secured-seal/index.html
Location-Independent Data/Software Integrity Protocol
    http://rfc1805.x42.com/
EUROMED-ETS schema
    Trusted Third Party Services for Deploying Secure Telemedical Applications over the WWW
        Diomidis SPINELLIS, Stefanos GRITZALIS, John ILIADIS, Dimitris GRITZALIS and Sokratis KATSIKAS
        Computers and Security, 18(7):627-639, 1999. (doi: 10.1016/S0167-4048(99)82041-0)

It should be noted that elements and/or features of different example embodiments may be combined with each other and/or substituted for each other within the scope of this disclosure and appended claims.

Still further, any one of the above-described and other example features of the present invention may be embodied in the form of an apparatus, method, system, computer program (including program modules for example) and computer program product. For example, of the aforementioned methods may be embodied in the form of a system or device, including, but not limited to, any of the structure for performing the methodology illustrated in the drawings.

Even further, any of the aforementioned methods may be embodied in the form of a program or program module. The program or program module may be stored on a computer readable media and is adapted to perform any one of the aforementioned methods when run on a computer device (any device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method of file conversion by a converter, comprising:
   receiving a file from a user at a client location, encrypted using a public key of the converter, where the converter is external to the client location;
   decrypting the file using a private key of the converter;
   converting the file format of the decrypted file at the converter, the decrypted file being stored in an allotted location in a memory of the converter for which read-only access to the stored decrypted file is provided, the memory being monitored for an attempt to access at least one memory location other than the allotted memory location and the file format conversion being aborted by the converter upon detecting attempt to access at least one memory location other than the allotted memory location;
   encrypting the file, if converted, using a public key of the user; and
   sending the encrypted file to the user, decryptable using a private key of the user, wherein
   the converter monitors for the attempt to access the at least one memory location and aborts the file conversion during the decrypting and the encrypting, such that the converter can not duplicate the file received from the client location.

2. The method of claim 1, wherein a memory placeholder is allotted in memory, to hold a memory location, the converted file being stored in the memory location held by the memory placeholder prior to encryption.

3. The method of claim 1, wherein upon detecting attempt to access at least one memory location other than the allotted memory location, the conversion is aborted and information in at least the allotted memory location of the memory is deleted.

4. A computer readable medium including program segments for, when executed on a computer device, causing the computer device to implement the method of claim 1.

5. The method of claim 1, further comprising:
   blanking the allotted memory location after encryption is completed.

6. The method of claim 1, further comprising:
deleting the file received from the user after the encryption is completed.

7. A method of file conversion, comprising:
storing a decrypted version of a previously encrypted file from a client location, the encryption and decryption occurring using public key infrastructure and external to the client location, in an allotted memory location of a memory for which read-only access to the stored decrypted file is provided;
monitoring the memory for an attempt to access at least one memory location other than the allotted location; and
converting a file format of the stored decrypted file, the conversion being aborted upon detecting attempt to access at least one memory location other than the allotted memory locationu, wherein
the monitoring monitors for the attempt to access the at least one memory location and aborts the conversion during the decryption and the encryption, such that the converting can not duplicate the file received from the client location.

8. The method of claim 7, wherein the file, upon successful conversion, is further encryptable and decryptable using public key infrastructure.

9. The method of claim 8, further comprising:
encrypting the file, if successfully converted, using a public key of a user of the file; and
sending the encrypted file to the user, decryptable using a private key of the user.

10. The method of claim 7, wherein upon the conversion being aborted, information in at least the allotted memory location of the memory is deleted.

11. The method of claim 7, wherein a memory placeholder is allotted in memory, to hold a memory location, the converted file being stored in the memory location held by the memory placeholder.

12. A computer readable medium including program segments for, when executed on a computer device, causing the computer device to implement the method of claim 7.

13. A converter for file conversion, comprising:
a memory to store a decrypted version of a previously encrypted file from a client location, the encryption and decryption occurring using public key infrastructure and external to the client location, the decrypted file being stored in an allotted memory location for which read-only access to the stored decrypted file is provided;
a first module to monitor the memory location for an attempt to access at least one memory location other than the allotted memory location;
a second module to convert a file format of the stored decrypted file, the conversion being aborted by the first module upon detecting attempt to access at least one memory location other than the allotted memory location;
means for encrypting the file, if successfully converted, using a public key of a user of the file; and
means for sending the encrypted file to the user, decryptable using a private key of the user, wherein
the first module monitors for the attempt to access the at least one memory location and aborts the conversion during the decryption and the encryption, such that the second module can not duplicate the file received from the client location.

14. The converter of claim 13, wherein the file, upon successful conversion, is further encryptable and decryptable using public key infrastructure.

15. The converter of claim 14, further comprising:
means for decrypting the encrypted file, using a private key of the converter, the file being encrypted using a public key of the converter.

16. The converter of claim 13, further comprising:
means for decrypting the encrypted file, using a private key of the converter, the file being encrypted using a public key of the converter.

17. The converter of claim 13, wherein upon detecting attempt to access at least one memory location other than the allotted memory location, the first module aborts the conversion by the second module and deletes information in at least the allotted memory location of the memory.

18. The converter of claim 13, wherein a memory placeholder is allotted in memory, to hold a memory location, the converted file being stored by the second module in the memory location held by the memory placeholder.

19. The converter of claim 13, wherein the first module is configured to blank the allotted memory location after the encryption is completed 20. The converter of claim 13, wherein the first module is configured to delete the file received from the user after the encryption is completed.

21. A converter for file conversion, comprising:
means for storing a decrypted version of a previously encrypted file from a client location, the encryption and decryption occurring using public key infrastructure and external to the client location, in an allotted memory location of a memory for which read-only access to the stored decrypted file is provided;
means for monitoring the memory for an attempt to access at least one memory location other than the allotted location;
means for converting a file format of the stored decrypted file, the conversion being aborted upon detecting attempt to access at least one memory location other than the allotted memory location;
means for encrypting the file, if successfully converted, using a public key of a user of the file; and
means for sending the encrypted file to the user, decryptable using a private key of the user, wherein
the means for monitoring monitors for the attempt to access the at least one memory location and aborts the conversion during the decryption and the encryption, such that the means for converting can not duplicate the file received from the client location.

22. The converter of claim 21, wherein the file, upon successful conversion, is further encryptable and decryptable using public key infrastructure.

23. The converter of claim 22, further comprising:
means for decrypting the encrypted file, using a private key of the converter, the file being encrypted using a public key of the converter.

24. The converter of claim 21, further comprising:
means for decrypting the encrypted file, using a private key of the converter, the file being encrypted using a public key of the converter.

25. The converter of claim 21, wherein upon detecting attempt to access at least one memory location other than the allotted memory location, the means for monitoring aborts the conversion by the means for converting and deletes information in at least the allotted memory location of the means for storing.

26. The converter of claim 21, wherein a memory placeholder is allotted in memory, to hold a memory location, the means for converting storing the converted file in the memory location held by the memory placeholder.

* * * * *